United States Patent [19]
Choudary et al.

[11] Patent Number: 6,087,289
[45] Date of Patent: Jul. 11, 2000

[54] PROCESS FOR THE PREPARATION OF A MOLECULAR SIEVE ADSORBENT FOR SELECTIVELY ADSORBING OXYGEN FROM A GASEOUS MIXTURE

[75] Inventors: Nettem Venkateshwarlu Choudary; Raksh Vir Jasra; Sodankoor Garadi Thirumaleshwar Bhat, all of Gujarat, India

[73] Assignee: Indian Petrochemical Corporation Limited, Gujarat, Ind.

[21] Appl. No.: 09/037,152

[22] Filed: Mar. 9, 1998

[30] Foreign Application Priority Data

Mar. 10, 1997 [IN] India ................. 149/BOM/97

[51] Int. Cl.[7] .................................. B01J 29/04
[52] U.S. Cl. ................... 502/62; 502/64; 502/65; 502/68; 502/73; 95/138; 95/902
[58] Field of Search .................. 502/62, 64, 65, 502/68, 73; 95/138, 902

[56] References Cited

U.S. PATENT DOCUMENTS

| | | | |
|---|---|---|---|
| 4,259,299 | 3/1981 | Hagiwara et al. ................ 423/210 |
| 4,631,267 | 12/1986 | Lachman et al. ................ 502/439 |
| 4,793,827 | 12/1988 | Lochow et al. ................ 44/65 |
| 4,822,492 | 4/1989 | Chao et al. ................ 210/679 |
| 5,104,425 | 4/1992 | Rao et al. ................ 55/16 |
| 5,190,902 | 3/1993 | Demmel ................ 502/63 |
| 5,200,377 | 4/1993 | Zones et al. ................ 502/62 |
| 5,202,014 | 4/1993 | Zones et al. ................ 208/46 |
| 5,215,648 | 6/1993 | Zones et al. ................ 208/46 |
| 5,387,564 | 2/1995 | Takeuchi et al. ................ 502/62 |
| 5,464,467 | 11/1995 | Fitch et al. ................ 95/98 |
| 5,633,217 | 5/1997 | Lynn ................ 502/439 |
| 5,696,043 | 12/1997 | Tissler ................ 502/64 |

*Primary Examiner*—Tom Dunn
*Assistant Examiner*—Cam N. Nguyen
*Attorney, Agent, or Firm*—Ladas & Parry

[57] ABSTRACT

The invention relates to the manufacture of novel molecular sieve adsorbents which are selective towards oxygen from its gaseous mixture with argon and/or nitrogen. More particularly, this invention relates to the manufacture of novel molecular sieve adsorbents useful for the separation of oxygen-argon-nitrogen gaseous mixture.

14 Claims, 5 Drawing Sheets

CHROMATOGRAM OF MIXTURE OF OXYGEN AND ARGON ON CeXP-1

PROCESS FOR THE PREPARATION OF A MOLECULAR SIEVE ADSORBENT FOR SELECTIVELY ADSORBING OXYGEN FROM A GASEOUS MIXTURE

The invention relates to the manufacture of novel molecular sieve adsorbents which are selective towards oxygen from its gaseous mixture with argon and/or nitrogen. More particularly, this invention relates to the manufacture of novel molecular sieve adsorbents useful for the separation of oxygen-argon-nitrogen gaseous mixture.

BACKGROUND OF THE INVENTION

Adsorption processes for the separation of oxygen and nitrogen from air are being increasingly used for commercial purposes for the last two decades. Presently, 4–5% of the world's oxygen demand is met by adsorptive separation of air. However, the maximum attainable oxygen purity by-adsorption processes is around 95%. Separation of 0.934 mole percent argon present in the air from oxygen being a limiting factor to achieve 100% oxygen purity by adsorption methods. However, there are many situations where high purity oxygen (>99%) is desired. For example, the efficiency of welding and cutting processes using oxygen is greatly dependent upon the purity of oxygen available. For these applications, purity of at least 99.5% oxygen is customarily specified. Furthermore, oxygen-argon separation is also needed for purification of argon produced during cryogenic separation of oxygen and nitrogen from air. The crude argon (95–97%) produced in such processes will have nitrogen and oxygen and is required to be further purified. Presently high purity argon (99.999%) is produced by catalytic hydrogen combustion or low temperature oxygen adsorption in a synthetic zeolite.

Oxygen and argon gaseous mixture is difficult to separate due to closeness in their physical properties. At present, commercially this is done by cryogenic fractionation techniques. The boiling points of oxygen (−182.97°), argon (−185.9° C.) and nitrogen (−195.8° C.) being very low make these processes highly energy intensive. Thus, it is desired to develop a commercially attractive separation process for oxygen-argon separation. Adsorption based process can compete with highly energy intensive cryogenic fractionation of oxygen/argon mixture if a suitable adsorbent which is selective towards one of the components and which possesses requisite adsorption capacity is commercially available.

In the prior art, adsorbents which are selective for argon from its mixture with oxygen has been reported (PCT Int. Appl. 94. 06. 541. Mar. 31, 1994) by impregnation of silver in commercial zeolites. However, the adsorption selectivity reported for argon is less than 2 in these adsorbents making it commercially unattractive. Oxygen with purity >99% has been produced (U.S. Pat. No. 4,813,979, 1989) by using carbon molecular sieve adsorbent in which argon is selectively adsorbed due to its smaller kinetic diameter of 3.40A° compared to 3.46A° of oxygen. However, there are no reports on the development of adsorbent which is selective towards oxygen from its mixture with argon in the literature. The present invention deals with the development of synthetic zeolite based oxygen selective adsorbents which can for the first time separate oxygen from a gaseous mixture of oxygen and argon.

Adsorption processes are also being used on a commercial scale for the production of nitrogen from air. These processes employ carbon molecular sieve type adsorbents in which oxygen diffuses faster than nitrogen resulting in the separation of the two components. Some efforts to develop zeolite type adsorbents for these applications have also been reported in the literature wherein the differences in the diffusion of oxygen and nitrogen have been used to achieve oxygen adsorption selectivity. It is desired to develop a zeolite based adsorbent which can result in the oxygen adsorption selectivity due to difference in equilibrium adsorption of oxygen and air.

The characteristics which are highly desirable, if not absolutely essential, for an adsorbent to be suitable for selective adsorption process include adsorption capacity of the adsorbent and adsorption selectivity for a particular component.

Adsorption capacity of the adsorbent is defined as the amount in terms of volume or weight of the desired component adsorbed per unit volume or weight of the adsorbent. The higher the adsorbent's capacity for adsorbing the desired component the better the adsorbent is as the increased adsorption capacity of a particular adsorbent helps to reduce the amount of adsorbent required to separate a specific amount of a component from a mixture of particular concentration. Such a reduction in adsorbent quantity in a specific adsorption process brings down the cost of a separation process.

Adsorption selectivity of component A over B is defined as $$O_{AB} = X_A Y_B / Y_A X_B$$

where O is adsorption selectivity, X is the adsorbed concentration and Y is gas-phase concentration. The expression gas-phase concentration means the amount of unadsorbed component remaining in the gas-phase. The adsorption selectivity of a component depends on steric factors such as difference in the shape and see of the adsorbate molecules;

equilibrium effect, i.e., when the adsorption isotherms of the components of the gas mixture differ appreciably;

kinetic effect, when the components have substantially different adsorption rates.

It is generally observed that for a process to be commercially economical, the minimum acceptable adsorption selectivity for the desired component is about 3 and when an adsorption selectivity is less than 2, it is difficult to design an efficient separation process.

Zeolites which are microporous crystalline aluminosilicates are finding increased applications as adsorbents for separating mixtures of closely related compounds. Zeolites have a three dimensional network of basic structural units consisting of $SiO_4$ and $AlO_4$ tetrahedral linked to each other by sharing of apical oxygen atoms. Silicon and aluminum atoms lie at the center of the tetrahedral. The resulting aluminosilicate structure which is generally highly porous possesses three dimensional pores the access to which is through molecular sized windows. In a hydrated form, the preferred zeolites are generally represented by the following Formula [I]

$$M_{2/n}O:Al_2O_3:xSiO_2:wH_2O \qquad [I]$$

where "M" is a cation which balances the electrovalence of the tetrahedral and is generally referred to as extra framework exchangeable cation, n represents the valency of the cation, x and w represent the moles of $SiO_2$ and water respectively. The cations may be any one of the number of cations which will hereinafter be described in detail.

The attributes which make them attractive for separation include, an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions.

Zeolite of type X structure as described and defined in U.S. Pat. No. 2,882,244 are the preferred adsorbents for adsorption separation of the gaseous mixture described in this invention. Zeolite of type X in hydrated or partially hydrated form can be described in terms of metal oxide of Formula II $$(0.9+/-0.2)M_{2/n}O:Al_2O_3:(2.5+/-0.5)SiO_2:wH_2O \quad [II]$$

where "M" represents at least one cation having valence n, w represents the number of moles of water the value of which depends on the degree of hydration of the zeolite. Normally, the zeolite when synthesized has sodium as exchangeable cations.

Zeolites as such have very little cohesion and it is, therefore, necessary to use appropriate binders to produce the adsorbent in the form of particles such as extrudates, aggregates, spheres or granules to suit commercial applications. Zeolitic content of the adsorbent particle vary from 60 wt % to 100 wt % depending on the type of binder used. Clays such as bentonite, kaolin and attapulgite are normally used as inorganic binders for agglomeration of zeolite powders.

SUMMARY OF THE INVENTION

It is an object of the present invention to provide adsorbents which can be used for the separation of oxygen-argon, oxygen-nitrogen and oxygen-nitrogen-argon gaseous mixtures.

Yet another object of the present invention is to provide an oxygen selective adsorbent based on synthetic zeolites.

Yet another object of the present invention is to provide an oxygen selective adsorbent by modification of surface characteristics of synthetic zeolites.

Yet another object of the present invention is to provide an adsorbent with high adsorption selectivity and capacity for oxygen from its mixture with argon and/or nitrogen.

Yet another object of the present invention is to provide an oxygen selective adsorbent which can be used commercially.

DESCRIPTION OF THE INVENTION

According to the present invention, there is provided a molecular sieve adsorbent having a composition $$x.M_{2/n}O:y.Ce_aO_b:Al_2O_3:z.SiO_2:w.H_2O$$

where the value of x is from 0.0 to 0.8;

y is from 0.06 to 0.50;

a is from 1 to 2;

b is from 2 to 3;

z is from 2 to 5.5;

M is alkali or alkaline earth metal ion such as lithium, sodium, potassium, calcium and w represents the number of moles of water.

The initial zeolite, i.e. the starting material of the present invention may be prepared by any technique known in the art. Typically, (i) a mixture of Zeolite powder type X as described in U.S. Pat. No. 2,882,244 or zeolite Y as described in U.S. Pat. No. 3,130,007 is prepared with a clay such as herein described and an organic binder such as herein described, (ii) adsorbent bodies of desired shape are formed or the adsorbent powder is subjected to cation exchange with one or more cations and then formed into adsorbent bodies, (iii) adsorbent bodies so formed are subjected to calcination (iv) the calcined adsorbent bodies are subjected to cation exchange with one or more cations if the cation exchange has been done in step (ii).

The present invention employs the technique of modification of the surface properties of the adsorbent bodies by cation exchange with one or more cations to obtain oxygen selective adsorbent from gaseous mixture of oxygen and argon.

The modification of the surface property, hereinafter referred to as surface modification is the most critical and important aspect of the invention. It is the very specific surface modification which renders the zeolite particularly selective towards oxygen. It has been surprisingly found that if zeolite at all x-type is treated with a cerium salt solution and/or a combination of cerium salt solution with lithium and/or calcium salt solution, it renders the zeolite particularly selective towards oxygen over argon.

Accordingly, the present invention provides a process for the preparation of a molecular sieve adsorbent for selectively adsorbing oxygen from a gaseous mixture consisting of oxygen, nitrogen and/or an inert gas such as argon said process comprising:

(a) preparing in any known manner a mixture of zeolite powder with conventional clay and organic binder;

(b) shaping said zeolite mixture to obtain adsorbent bodies of desired shape;

(c) subjecting adsorbent bodies to calcination; and (d) subjecting said adsorbent bodies either prior to or after calcination or both, to cationic exchange in the presence of at least a cerium salt solution to effect surface modification of said adsorbent bodies to obtain said molecular sieve adsorbent which is oxygen selective.

While the aforesaid surface modification may be carried out at a wide range of temperature and concentration, excellent results are obtained if the surface modification supply is carried out with 1 to 10% by weight of the salt solution at a temperature of 30 to 100° C. for 4 to 48 hrs.

The adsorbent bodies are prepared from a mixture of zeolite of type X and clay powder with an addition of an organic binder like sodium lignosulfonate or starch or polyvinyl alcohol. Bentonite type clay preferably about 2 to 40% by weight is normally used for aggregation of zeolite powder. As the clay remains as an inert component in the adsorbent body and do not display any adsorption properties, the adsorption capacity and selectivity of the adsorbent body decreases in proportion to the amount of the clay added in the body.

In a typical process for producing adsorbent pellets, zeolite powder of type X or type Y was mixed with desired quantity of clay. A known quantity of an organic binder like sodium lignosulfonate was added to this mixture which was then subjected to ball milling for some specified period to have powder particles less than 60 microns. The powder thus obtained was formed into bodies using a pan granulator or an extruder. The particles prepared by the above described method were first dried in air at room temperature (28 to 32° C.) for about 6 to 18 hours followed by oven drying at 110° C. for 6 to 8 hours. The dried particles were subjected to air calcination at 450 to 700° C. for 2–18 hours followed by aforesaid surface modification.

The quantity of exchangeable cations in the adsorbent particles after the above treatment is determined by digesting the known amount of adsorbent particles in hot hydrochloric acid and then making the aqueous solution. The quantitative estimation of the cations in the aliquot solution is done by Atomic Absorption Spectroscopic measurement.

The loss of crystallinity in the adsorbent particles, if any, was checked by comparing the X-ray diffraction data with literature X-ray data. The X-ray diffractions at 'd' values 14.465, 8.845, 7.538, 5.731, 4.811, 4.419, 3.946, 3.808, 3.765, 3.338, 3.051, 2.944, 2.885, 2.794 and 2.743A° were used for comparison. Water adsorption capacity data on the above treated adsorbent particles were also compared with a standard zeolite NaX. Water adsorption capacity was measured using a Mcbain-Bakr quartz spring balance.

Oxygen/argon/nitrogen adsorption capacity and selectivity were measured by elution chromatography. In this technique, the adsorbent sample was ground and sieved to obtain 60–80 mesh particles and packed in a thoroughly cleaned 6×600 mm stainless steel column which was placed in an oven of a gas chromatography. In those cases where the starting material was zeolite powder, it was first pressed in to pellets in a hydraulic press to obtain compact particles and then ground and sieved to obtain 60–80 mesh particles. The adsorbent was activated by subjecting it to programmed heating from ambient to 400° C. at the heating rate of 2° C./minute and held at 400° C. for 12 hours with the flow of 60 ml/minute of ultra-high purity hydrogen. Alter the activation, the column temperature was brought down to ambient temperature and the hydrogen gas flow was reduced to 30 ml/minute. A 0.5 mL pulse of gas mixture consisting of oxygen, argon, nitrogen and helium in hydrogen was injected in to the adsorbent column using a sampling valve, and the retention times of gases measured. The procedure was repeated at 40, 50 and 60° C. The column was equilibrated for at least 1 hour at each temperature before injecting the gas mixture. The corrected retention times were obtained by subtracting the helium retention time from those of oxygen, argon and nitrogen. In those cases where separation did not take place, retention times were measured by injecting individual gases. To check whether there was any contribution to measured retention time due to possible oxidation-reduction reactions, measurements without hydrogen were also done by using helium rather than hydrogen. The measured retention times were found within experimental errors indicating the absence of oxidation-reduction reactions.

The corrected retention time was used to determine the Henry constant (i.e. a measure of equilibrium adsorption capacity of an adsorbent for a particular component), adsorption selectivity and heats of adsorption for oxygen and argon employing standard formulae described below:

$$\text{Henry constant } K/\text{mmol. g}^{-1}.\text{kPa}^{-1}=V_N/RT$$

where R is a gas constant having value of 8.31451 $JK^{-1}mol^{-1}$, T is the adsorbent column temperature in Kelvin and $V_N$ is the net retention volume per gram of adsorbent and is given by Net retention volume, $$V_N/\text{cm}^3.\text{g}^{-1}=[Ft_Rj/(1-p_w/P_o)T/T_R]/W_s$$

where F is carrier gas flow rate (ml/minute); $t_R$ is corrected retention time (minute); $P_w$ is water vapor pressure (kPa) at room temperature $T_R$, T is the adsorbent column temperature in Kelvin, $p_o$ is column outlet pressure ($KP_a$), $W_s$, is active weight of the adsorbent present in the column and j is the compressibility correction given by the equation shown below $$\text{Compressibility correction, } j=(3/2)[(p_i/p_o)^2-1]/(p_i/p_o)]$$

where $p_i$ and $p_o$ are the column inlet and outlet pressures respectively.

Adsorption selectivity $\alpha O_2/Ar = V_n(O_2)/V_n(Ar)$

Heat of adsorption, $-\Delta H_o = R \, d\ln(V_n/T)/d(1/T)$

In the formula $-\Delta H_o = R \, d\ln(V_N/T)/d(1/T)$ the letter 'd' represents the mathematical operation called 'differentiation' and ln presents 'natual logarithm'. This can be alternatively written as follows:

$$-\Delta H_o = R \frac{d}{d[1/T]}[\ln(V_N/T)]$$

In fact, $d\ln(V_N/T)/d(1/T)$ represents the slope of the straight line plotted with $1/T$ as x-axis and $V_N/T$ as y-axis. T, $V_N$ and R are defined elsewhere in this specification.

The uncertainties in the values of $V_n$, $\alpha O_2/Ar$ and $-\Delta H_o$ as calculated using the method of propagation of errors from the known errors in the experimental parameters were +0.8, +1.6 and +1.8% respectively.

The invention will now be illustrated with the help of typical Examples. It may be understood that the following Examples do not limit the scope of the invention. It is possible to work the invention outside the parameters specified in the following Examples.

EXAMPLE-1

Zeolite NaX powder ($Na_2O:Al_2O_3:2.4SiO_2:w.H_2O$) was prepared by the method described in U.S. Pat. No. 2,882,244. Water adsorption as given in Table 1 and X-ray diffraction data showed that the starting zeolite powder was highly crystalline. Adsorbent was evaluated for Oxygen/Argon adsorption capacity and selectivity by elution gas chromatography as per procedure detailed above. Oxygen and argon did not give separate chromatographic peaks showing thereby that these are not getting separated by the adsorbent in the column. Hence the retention time of oxygen and argon were measured separately. The adsorption data are given in Table 2. The data show that the adsorbent posses little oxygen selectivity ( $O_2/Ar=1.1$) over argon.

EXAMPLE-2

Zeolite NaY powder ($Na_2O:Al_2O_3:5.4.SiO_2:w.H_2O$) was prepared by the method described in the U.S. Pat. No. 3,130,007. Water adsorption as given in Table 1 as well as X-ray diffraction data showed that the starting zeolite powder is highly crystalline. Adsorbent was evaluated for Oxygen/Argon adsorption capacity and selectivity by elution gas chromatography as per procedure detailed above. Oxygen and argon did not show separate chromatographic peaks showing thereby that these are not getting separated by the adsorbent in the column. The retention times of oxygen and argon were measured separately. The adsorption data given in Table 2 show that the adsorbent does not possess oxygen selectivity ($O_2/Ar=1.0$) over argon.

EXAMPLE-3

Zeolite NaY powder prepared by the method described earlier was further treated with 1.5 wt % aqueous cerium (III) chloride at 95° C. for 48 hours. The solution was thereafter filtered and the solid was washed with hot distilled water until solution showed the absence of chloride in it. Equilibrium water adsorption capacity is given in Table 1 and X-ray diffraction data show that the zeolite structure is retained after cerium (III) chloride solution treatment. The elution gas chromatography data of thus prepared adsorbent, CeVP having chemical composition of $0.07.Na_2O:0.31.Ce_2O_3:Al_2O_3:5.4.SiO_2:w.H_2O$ is as given in Table 2 (and show that the adsorbent is oxygen selective ($O_2/Ar=1.5$).

EXAMPLE-4

A mixture consisting of 800 g of zeolite NaX powder with chemical composition, $Na_2O:Al_2O_3:2.4SiO_2:w.H_2O$, 200 g of bentonite clay powder and 4 g of sodium lignosulfonate was ball milled for 1 hour and particles larger than 60 microns were removed by sieving. The ball milled mixture was then hand pugged by adding water and pugged mass was extruded though a die by a hand extruder. The extruded adsorbent was dried at room temperature for 10 hours and then at 110° C. for 6 hours. This was followed by calcination at 560° C. for 4 hours. Water adsorption given in Table 1 on thus obtained adsorbent particles, NaXE show that the decrease in adsorption capacity compared to zeolite NaX powder is in proportion to bentonite amount in the adsorbent. X-ray diffraction data also supports the retention of zeolite structure. Adsorbent was evaluated for oxygen/argon/nitrogen adsorption capacity and selectivity by elution gas chromatography. Oxygen and argon did not show separation by the adsorbent. Hence, the retention times of oxygen and argon were measured independently. The adsorption data as given in Table 2 show little selectivity towards oxygen over argon ($O_2/Ar=1.1$).

EXAMPLE-5

Figure 1:
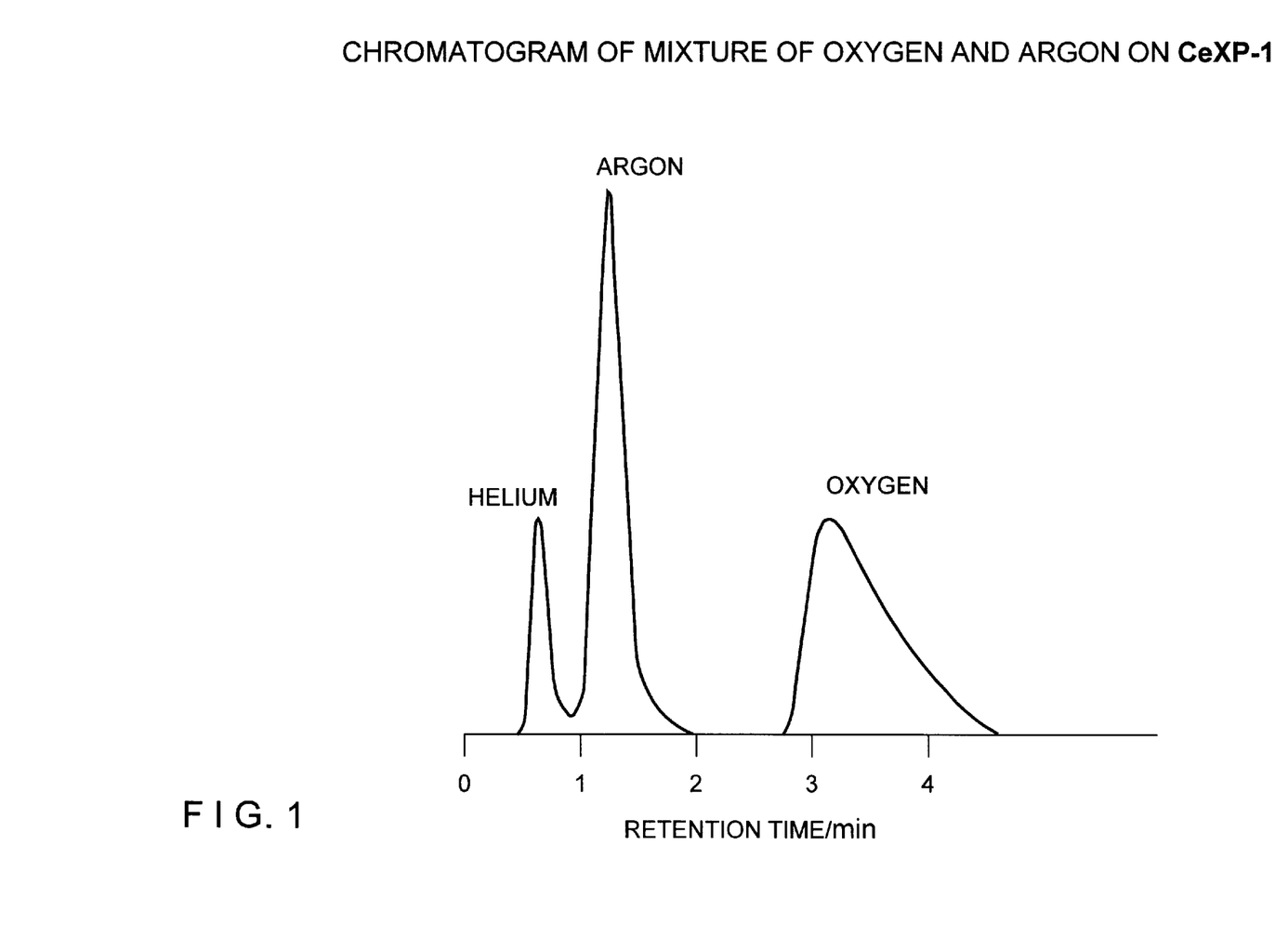
FIG. 1 is a chromatogram of mixture of oxygen and argon on CeXP-1.

40 g of zeolite NaX powder prepared by the method described earlier was treated with 1.4 wt % aqueous solution of cerium (III) chloride at 95° C. The solution was thereafter filtered and the solid was washed with hot distilled water until the solution showed the absence of chloride in it. The adsorbent was then dried in an air oven. Equilibrium water adsorption capacity is given in Table 1 and X-ray diffraction data shows that the zeolite structure is retained after cerium (III) chloride solution treatment. The chromatogram for the mixture of oxygen and argon eluted from this adsorbent at 30° C. is shown in FIG. 1. The elution gas chromatography data of thus prepared adsorbent CeXP-1 having chemical composition as $0.09.Na_2O:0.30.Ce_2O_3:Al_2O_3:2.4.SiO_2:w.H_2O$ given in Table 2 show that the adsorbent is oxygen selective with $O_2/Ar$ and $O_2/N_2$ of 4.1 and 1.5 respectively.

EXAMPLE-6

Figure 2:
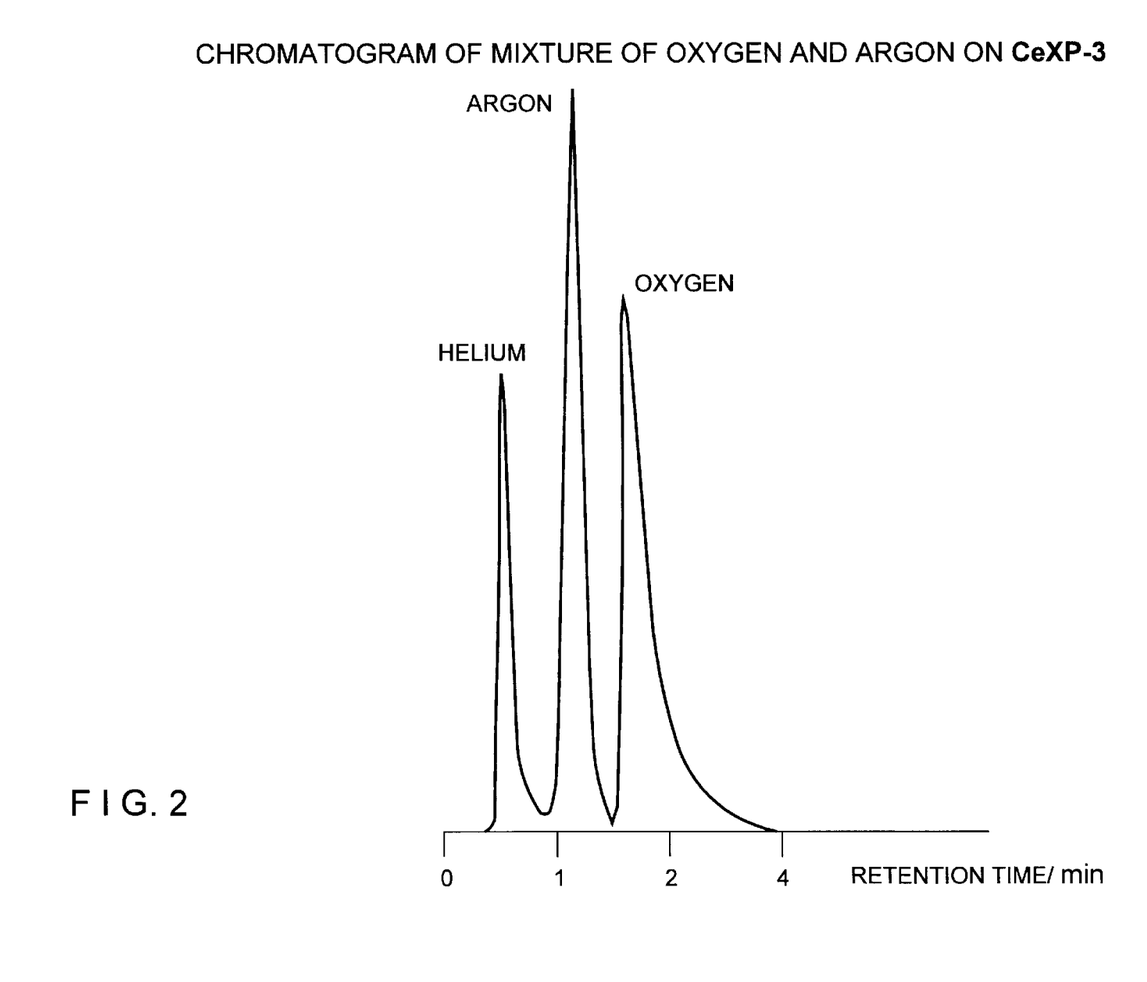
FIG. 2 is a chromatogram of mixture of oxygen and argon on CeXP-3.

The adsorbent obtained by the method as described in Example-4 was further treated with 1 wt % aqueous solution of cerium (III) chloride twice using the procedure described in Example-5. The adsorbent was, then dried at 110° C. Equilibrium water adsorption capacity as given in Table 1 and X-ray diffraction data show that the zeolite structure is retained after cerium chloride treatment. The chromatogram for the mixture of oxygen and argon eluted from this adsorbent at 30° C. is shown in FIG. 2. The elution gas chromatography data of thus prepared adsorbent, CeXP-3 having chemical composition, $0.04.Na_2O:0.32.Ce_2O_3:Al_2O_3:2.4.SiO_2:w.H_2O$ given in Table 2 show that adsorbent is oxygen selective with $O_2/Ar$ of 2.1.

EXAMPLE 7

Figure 3:
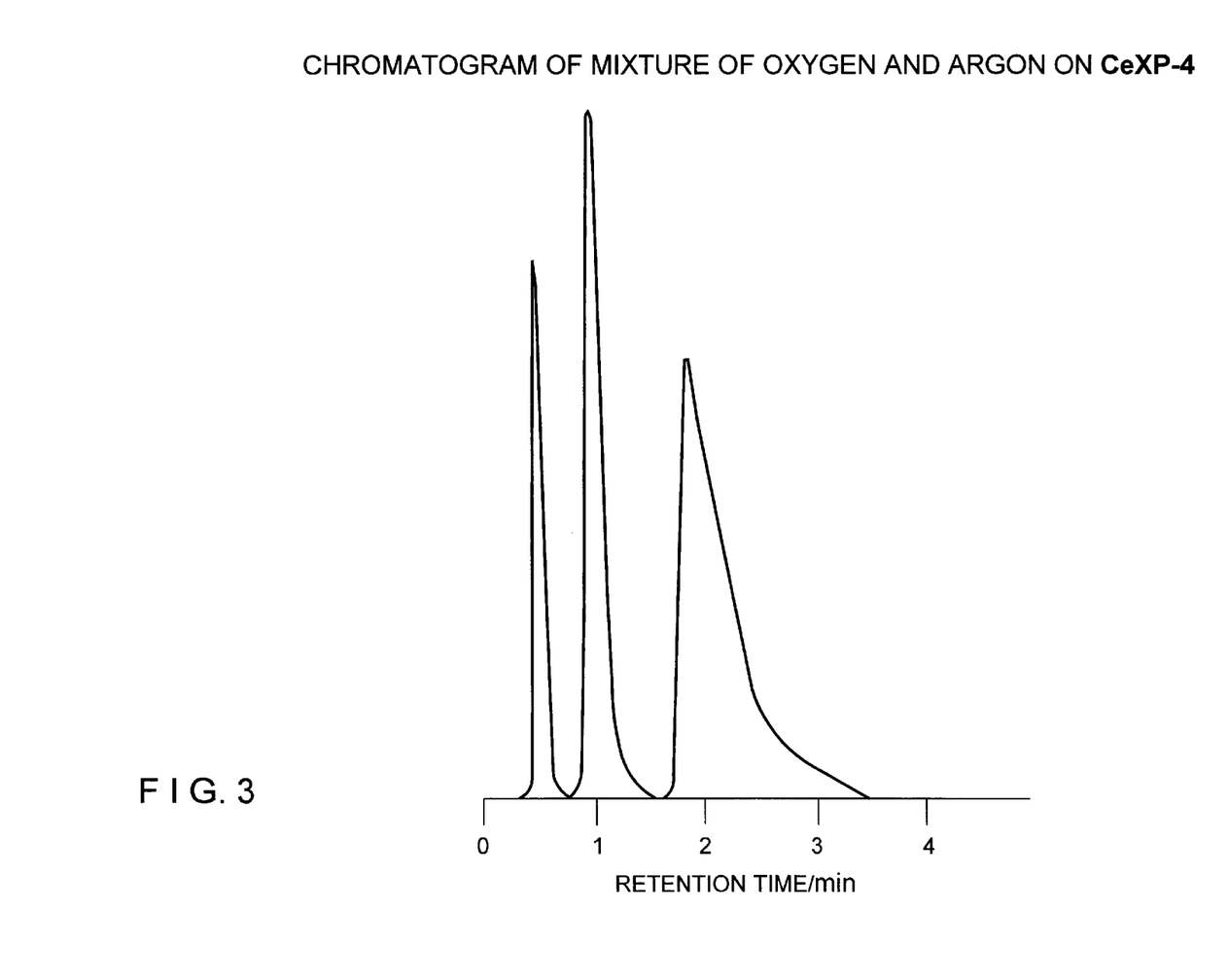
FIG. 3 is a chromatogram of mixture of oxygen and argon on CeXP-4.

The adsorbent obtained by the method as described in Example-5 was further treated with aqueous solution of 1 wt % cerium (III) chloride in a 5 liter flask in three stages employing the same procedure as given in Example-5. Thereafter the adsorbent was washed with hot distilled water until the solution showed the absence of chloride. The adsorbent was then dried at 110° C. for 6 hours. Equilibrium water adsorption capacity as given in Table 1 and X-ray diffraction data show that the zeolite structure is intact after cerium (III) chloride treatment. The chromatogram for the mixture of oxygen and argon eluted from this adsorbent at 30° C. is shown in FIG. 3. The elution gas chromatography data of thus prepared adsorbent, CeXP-4, having chemical composition $0.02.Na_2O:0.33.Ce_2O_3:Al_2O_3:2.4.SiO_2:w.H_2O$ given in Table 2 show that adsorbent is oxygen selective over argon with $O_2/Ar$ of 3.8.

EXAMPLE-8

Figure 4:
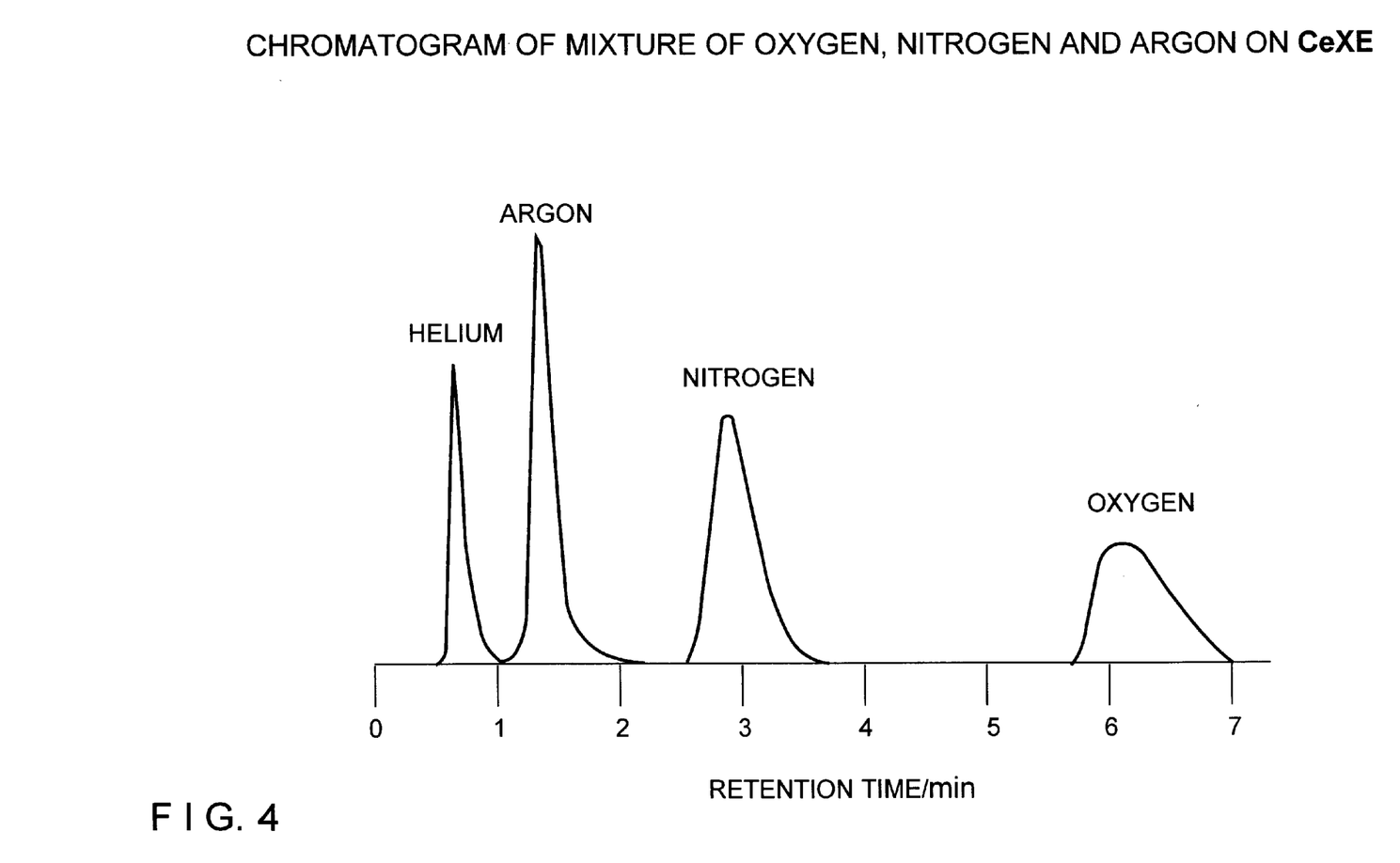
FIG. 4 is a chromatogram of mixture of oxygen, nitrogen and argon on CeXE.

Zeolite NaX extrudates made using the method described in Example 4 were further treated with aqueous solution of 2 wt % cerium (III) chloride. The adsorbent was then washed with hot distilled water until the solution contained no traces of chloride in it. Thereafter the adsorbent was dried in an air oven. Equilibrium water adsorption capacity as given in Table 1 and X-ray diffraction data show that the zeolite structure is retained after cerium chloride treatment. The chromatogram for the mixture of oxygen, nitrogen and argon eluted from this adsorbent at 30° C. is shown in FIG. 4. The elution gas chromatography data of thus prepared adsorbent, CeXE, having chemical composition $0.07.Na_2O:0.31.Ce_2O_3:Al_2O_3:2.4.SiO_2:w.H_2O$ given in Table 2 show that adsorbent is oxygen selective with $O_2/Ar$ and ($O_2/N_2$ of 5.9 and 2.0 respectively.

EXAMPLE-9

The adsorbent bodies obtained by the method as described in Example-4 were further treated several times with lithium chloride solution (1% wt) to arrive at chemical composition of $0.02.Na_2O:0.98.Li_2O:Al_2O_3:2.4.SiO_2:w.H_2O$. The adsorbent LiXE, thus obtained was dried at 110° C. for 6 hours in an air oven. The zeolite structure is retained after lithium chloride treatment as all the prominent diffractions present in pure zeolite X powder were present. The water equilibrium adsorption capacity is given in Table 1. The adsorption data given in Table 2 shows that adsorbent has very small selectivity ($O_2/Ar$ of 1.3) for oxygen from its mixture with argon.

EXAMPLE 10

The adsorbent bodies having a chemical composition of $0.02.Na_2O:0.98.Li_2O:Al_2O_3:2.4.SiO_2:w.H_2O$ prepared using the method Example-9 were further treated with 1 wt % aqueous cerium (III) chloride solution at 95° C. The adsorbent was then washed with hot distilled water until all the chloride is removed and dried in am air oven. The zeolite structure, LiCeXE, thus obtained having a chemical composition of $0.18Li_2O.0.27Ce_2O_3.Al_2O_3.2.4SiO_2.wH_2O$ was retained after the above treatment as all the prominent diffractions present in pure zeolite X powder were present. The water equilibrium adsorption capacity is given in Table 1. The adsorption data given in Table 2 shows that adsorbent is oxygen selective over argon with $O_2/Ar$ of 4.1.

EXAMPLE-11

100 g of the adsorbent extrudates prepared by the method as described in Example-4 were treated with 10 wt % aqueous solution of potassium chloride in a one liter round bottomed flask at 95° C. The solution was thereafter decanted and the adsorbent was washed with hot distilled water until the decanted solution showed the absence of chloride. The adsorbent was then dried in an air oven. The zeolite structure is retained after potassium chloride treatment as all the prominent diffractions typical of pure zeolite X powder are present. The water equilibrium adsorption capacity is given in Table 1. The elution gas chromatography data of thus prepared adsorbent, KXE, having chemical composition of $0.39.Na_2O:0.61.K_2O$: $0.61.K_2O:Al_2O_3:2.4.SiO_2:w.H_2O$ given in Table 2 does not show selectivity for oxygen over argon with $O_2/Ar$ of 1.1.

EXAMPLE-12

The adsorbent extrudates obtained by the method as described in Example-4 were further refluxed with 10 wt % aqueous calcium chloride solution in three stages. The solution was thereafter decanted and the adsorbent was washed with hot distilled water until all the chloride is removed. The adsorbent thus obtained CaXE, had a chemical composition of $0.07.Na_2O:0.93CaO:Al_2O_3:2.4.SiO_2:w.H_2O$. The zeolite structure was intact after calcium chloride treatment as all the prominent diffractions present in pure zeolite K powder are present. The water equilibrium adsorption capacity is given in Table 1. The adsorption data given in Table 2 shows that adsorbent has very small oxygen selectivity with $O_2/Ar$ of 1.3.

EXAMPLE-13

Figure 5:
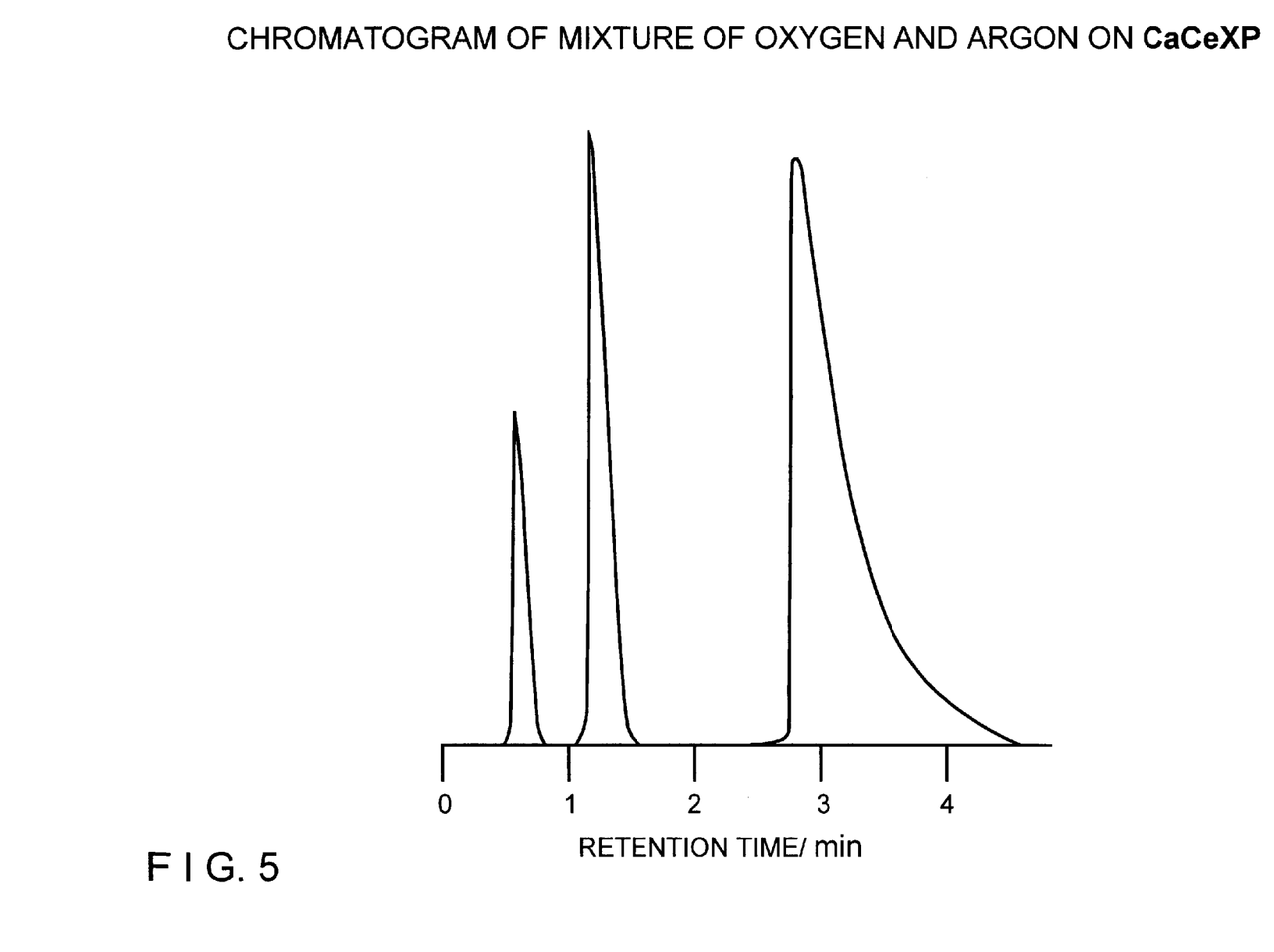
FIG. 5 is a chromatogram of mixture of oxygen and argon on CaCeXP.

The adsorbent bodies having a chemical composition of $0.07.Na_2O:0.93.CaO:Al_2O_3:2.4.\ SiO_2:w.H2O$ prepared using the method described in Example-12 were further treated with 1wt% aqueous cerium chloride solution at 95° C. The adsorbent was then washed with hot distilled water until all the chloride is removed and dried in air oven. The zeolite structure, CaCeXE, thus obtained had a chemical composition of $0.15CaO:0.28Ce_2O_3:Al_2O_3:2.4.SiO_2:w.H_2O$ and showed that the structure is intact after the above treatment as all the prominent diffractions present in pure zeolite powder were present. The water equilibrium adsorption capacity is given in Table 1. The adsorption data given in Table 2 shows that the adsorbent is oxygen selective over argon ($O_2/Ar$ of 3.7). The chromatogram for the mixture of oxygen and argon eluted from this adsorbent is shown in FIG. 5.

EXAMPLE-14

The adsorbent extrudates obtained by the method as described in Example-4 were further treated several times with 10 wt % aqueous solution of strontium nitrate solution to arrive at a chemical composition of $0.04.Na_2O:0.96.SrO:Al_2O_3:2.4.SiO_2:w.H_2O$. The adsorbent, SrXE, thus obtained was dried at 110° C. for 6 hours in an air oven. The zeolite structure was intact after strontium nitrate treatment as all the prominent diffractions typical of pure zeolite X powder were present.

Wherever the treatment temperature and time are not mentioned in the examples these should be read as 95° C. and 24 hours respectively.

The water equilibrium adsorption capacity is given in Table 1. The adsorption data given in Table 2 shows that adsorbent has very small oxygen selectivity over argon with $O_2/Ar$ of 1.3.

TABLE 1

Oxide formula and equilibrium water adsorption capacity at 30° C. of various adsorbents

| Example | Adsorbent | Equilibrium Water Adsorption mmol/g of adsorbent |
| --- | --- | --- |
| Example-1 | NaXP | 18.3 |
| Example-2 | NaYP | 15.8 |
| Example-3 | CeYP | 12.2 |
| Example-4 | NaXE | 14.4 |
| Example-5 | CeXP-1 | 14.8 |
| Example-6 | CeXP-3 | 14.5 |
| Example-7 | CeXP-4 | 13.9 |
| Example-8 | CeXE | 12.8 |
| Example-9 | LiXE | 16.6 |
| Example-10 | LiCeXE | 12.7 |
| Example-11 | KXE | 12.3 |
| Example-12 | CaXE | 15.2 |
| Example-13 | CaCeXE | 11.8 |
| Example-14 | SrXE | 13.3 |

TABLE 2

Adsorption data for oxygen/argon/nitrogen gaseous mixture on different adsorbents at 30° C.

| Adsorbent | Henry constant K/mmol.g$^{-1}$kPa$^{-1}$ | | | Adsorption Selectivity, kJmol$^{-1}$ | | | Heat of adsorption, | | |
| --- | --- | --- | --- | --- | --- | --- | --- | --- | --- |
| | $O_2$ | $N_2$ | Ar | $O_2/Ar$ | $O_2/N_2$ | $N_2/Ar$ | $O_2$ | $N_2$ | Ar |
| NaXP | 1.60 | 4.78 | 1.49 | 1.1 | 0.3 | 3.2 | 11.9 | 16.5 | 11.5 |
| NaXE | 0.97 | 3.17 | 0.91 | 1.1 | 0.3 | 3.5 | 12.0 | 18.5 | 11.2 |
| NaYP | 0.97 | 2.19 | 0.93 | 1.0 | 0.4 | 2.4 | 11.4 | 15.5 | 10.9 |

TABLE 2-continued

Adsorption data for oxygen/argon/nitrogen gaseous mixture on different adsorbents at 30° C.

| Adsorbent | Henry constant K/mmol.g$^{-1}$kPa$^{-1}$ | | | Adsorption Selectivity, kJmol$^{-1}$ | | | Heat of adsorption, | | |
|---|---|---|---|---|---|---|---|---|---|
| | O$_2$ | N$_2$ | Ar | O$_2$/Ar | O$_2$//N$_2$ | N$_2$/Ar | O$_2$ | N$_2$ | Ar |
| CeYP | 1.25 | 1.20 | 0.76 | 1.6 | 1.0 | 1.6 | 13.4 | 13.5 | 10.9 |
| CeXP-1 | 3.17 | 2.15 | 0.77 | 4.1 | 1.5 | 2.8 | 30.6 | 19.4 | 10.8 |
| CeXP-3 | 1.50 | 2.63 | 0.72 | 2.1 | 0.6 | 3.6 | 23.1 | 22.5 | 11.3 |
| CeXP-4 | 2.65 | 2.60 | 0.71 | 3.8 | 1.0 | 3.7 | 28.9 | 23.6 | 12.9 |
| CeXE | 4.25 | 2.16 | 0.72 | 5.9 | 2.0 | 3.0 | 33.1 | 20.7 | 13.1 |
| CaXE | 1.49 | 12.63 | 1.14 | 1.3 | 0.1 | 11.1 | 15.3 | 28.8 | 13.6 |
| SrXE | 1.44 | 8.62 | 1.12 | 1.3 | 0.2 | 7.7 | 13.9 | 25.2 | 13.4 |
| KXE | 0.95 | 1.72 | 0.87 | 1.1 | 0.6 | 2.0 | 11.6 | 16.2 | 11.2 |
| LiXE | 1.28 | 11.93 | 1.01 | 1.3 | 0.1 | 11.8 | 13.4 | 27.0 | 12.3 |
| LiCeX | 2.75 | 2.24 | 0.67 | 4.1 | 1.2 | 3.3 | 25.7 | 22.5 | 11.3 |
| CaCeX | 2.50 | 2.76 | 0.68 | 3.7 | 0.9 | 4.1 | 27.3 | 23.4 | 11.8 |

What is claimed is:

1. A process for preparing a molecular sieve adsorbent for selectively adsorbing oxygen from a gaseous mixture comprising oxygen and nitrogen; oxygen and an inert gas; or oxygen, nitrogen and inert gas said process comprising:
   (a) preparing a mixture of zeolite powder from zeolite X or zeolite Y, clay and an organic binder;
   (b) shaping said zeolite mixture to obtain zeolite adsorbent bodies;
   (c) subjecting said adsorbent bodies to calcination; and
   (d) subjecting said adsorbent bodies either prior to or after calcination or both, to cationic exchange in the presence of at least a cerium salt solution to effect surface modification of said adsorbent bodies to obtain said molecular sieve adsorbent which is oxygen selective.

2. The process as claimed in claim 1, wherein the zeolite adsorbent body has the formula $$x.M_{2/n}O:y.Ce_aO_b:Al_2O_3:z.SiO_2:w.H_2O$$

where the value of x is 0.0 to 0.8, y is from 0.06 to 0.50, a is from 1 to 2, b is from 2 to 3, z is from 2 to 5.5, M is alkali or alkaline earth metal ion, and w represents the moles of water.

3. The process as claimed in claim 2, wherein M is lithium, sodium, potassium or calcium.

4. The process as claimed in claim 1, wherein said cation exchange is carried out in the presence of a cerium salt solution in combination with lithium, calcium salt solution or a mixture thereof.

5. The process as claimed in claim 1, wherein said clay is bentonite clay.

6. The process as claimed in claim 1, wherein said clay is present in an amount of 2 to 40% by weight.

7. The process as claimed in claim 1, wherein said binder is selected from the group consisting of sodium lignosulfate, starch and polyvinyl alcohol.

8. The process as claimed in claim 1, wherein said zeolite mixture is subjected to ball milling to produce powders of particle size of less than 60 microns.

9. The process as claimed in claim 1, wherein said calcination is carried out at a temperature of 450° C. to 700° C.

10. The process as claimed in claim 1, wherein said calcination is carried out for a period of from 2 to 18 hrs.

11. The process as claimed in claim 1, wherein said cation exchange is carried out at a concentration of 1 to 10% by weight.

12. The as claimed in claim 1, wherein said cation exchange is carried out with 1 to 10% by wt. of said aqueous solution at a temperature of 30 to 100° C. for 4 to 48 hrs.

13. A molecular sieve adsorbent having a composition $$x.M_{2/n}O:y.Ce_aO_b:Al_2O_3:z.SiO_2:w.H_2O$$

where the value of x is 0.0 to 0.8, y is from 0.06 to 0.50, a is from 1 to 2, b is from 2 to 3, z is from 2 to 5.5, M is alkali or alkaline earth metal ion, and w represents the moles of water.

14. The adsorbent according to claim 13 wherein M is lithium, sodium, potassium or calcium.

* * * * *